United States Patent [19]

Naka

[11] 4,240,521

[45] Dec. 23, 1980

[54] DRAWER TYPE EMERGENCY ESCAPE

[75] Inventor: Hiromitsu Naka, Yashio, Japan

[73] Assignee: Kabushiki Kaisha Naka Gijutsu Kenkyusho, Sapporo, Japan

[21] Appl. No.: 37,335

[22] Filed: May 9, 1979

[30] Foreign Application Priority Data

Jan. 27, 1979 [JP] Japan .................................. 54-8464

[51] Int. Cl.³ .......................... E06C 9/10; B60R 3/00

[52] U.S. Cl. ...................................... 182/84; 182/100; 182/189; 182/195; 280/166

[58] Field of Search ....................... 182/77, 78, 83, 84, 182/88, 100, 115, 157, 158, 156, 195; 280/166

[56] References Cited

U.S. PATENT DOCUMENTS

| | | | |
|---|---|---|---|
| 43,283 | 6/1864 | Ballentine | 182/77 |
| 3,341,223 | 9/1967 | Wampler | 182/88 |
| 3,796,454 | 3/1974 | Bergeson | 182/88 |
| 3,999,627 | 12/1976 | Naka | 182/100 |
| 4,079,812 | 3/1978 | Naka | 182/100 |

*Primary Examiner*—Reinaldo P. Machado
*Attorney, Agent, or Firm*—Wenderoth, Lind & Ponack

[57] ABSTRACT

A drawer type emergency escape is constituted by a stowage box adapted to be attached to a support, a slidable frame adapted to be slidably extended out of and retracted into the stowage box, a telescopically extensible escape means attached to the slidable frame to be received into and extended out of the frame, and a shift mechanism for pulling the slidable frame out of the stowage box as the escape is employed. The shift mechanism includes a drive arm connected to a shift handle, a slide shift link, a connection link connecting the drive arm to the slide shift link and an extensible tong means disposed between the slide shift link and slidable frame for extending and retracting the slidable frame out of and into the stowage box.

19 Claims, 34 Drawing Figures

DRAWER TYPE EMERGENCY ESCAPE

BACKGROUND OF THE INVENTION

This invention relates to a drawer type emergency escape adapted to be mounted on buildings, ships, article hoisting and transporting machines employed in factories, harbours, iron works mills, shipbuilding yards and mines, construction machines employed in earthmoving sites, mining machines employed in mines and other large size machines and equipments.

Hitherto, there has been used as an emergency escape system for a multi-story building an escape chute, a rope ladder, an escape rope or the like and this has been installed in a box at the point in a room adjacent to the window or emergency exit thereof. When it is to be employed, it must be taken out of a storage box and thrown down through the window or exit and persons on the ground must secure the lower end of the escape system by any suitable means. Thereafter, the evacuees can escape to the safer ground. Thus, the conventional escape system requires a relatively long time for its preparation for use and, in addition, is not able to give simultaneous and quick refuge to a number of evacuees.

Evacuating by a chute simply suspended from the room where an emergency such as fire occurs has been tried, but it tends to be limited with respect to the height of the building where it can be employed and, therefore, it cannot be installed on a large multi-story building.

There has been used an emergency stairway such as a stationary ladder provided outside of the building. However, when such a stairway is provided, the exit door should be locked in order to prevent an intrusion of thieves, etc. and various articles tend to be placed adjacent to the exit door. Thus, when an emergency occurs, the door cannot be quickly opened, with the result that many casualities have occurred.

Such emergency stairway is known to be a relatively effective installation, except for its imperfect maintenance. However, the scale and installation position are determined relative to the surrounding buildings and the road condition rather than from the standpoint of the safety of the people in the building where it is installed, because it is normally installed in a manner in which it projects from the building wall. In addition, such a stairway for a multi-story building is a large-scale structure and, therefore, lacks a sense of beauty.

In order to avoid such incidents, an emergency escape has been proposed which is adapted to be normally contained in an opening of the building wall so as to constitute a part of the building wall and on emergency to be swung down so as to form a veranda permitting evacuation. However, there are many problems to be solved, in connection therewith such as operation for evacuation, operating performance and durability with respect to natural conditions.

Article hoisting and transporting machines, construction machines and mining machines each generally has the cab disposed in a position substantially above the ground, but is usually equipped with no emergency escape. Of late, large passenger planes each is equipped with an emergency evacuate chute which is adapted to spread and extend upon being filled with an incombustible gas under pressure in a brief time to thereby form an evacuation path through which passengers can evacuate from the plane to the ground. However, this type of evacuation chute has to be extended downwardly until the lower end of the chute reaches the ground and thus, the evacuation chute encounters difficulties in mounting the chute on article hoisting and transporting machines, construction machines and mining machines.

SUMMARY OF THE INVENTION

Therefore, one object of the present invention is to provide a drawer type emergency escape which can be standardized for adaption to mass production in factory.

Another object of the present invention is to provide a drawer type emergency escape which can be easily and simply mounted on newly built and existing buildings, ships, article hoisting and transporting machines, construction machines, mining machines and other large size machines and equipments.

Another object of the present invention is to provide a drawer type emergency escape which can communicate between higher and lower areas to form an evacuation path therebetween without the necessity for fixedly securing the lower end thereof to any support structure.

Another object of the present invention is to provide a drawer type emergency escape which is easy in manipulation and safe, rapid and positive in operation.

Another object of the present invention is to provide a drawer type emergency escape which can reduce efforts required in extending from the storaged or retracted position to the operative or extended position.

Another object of the present invention is to provide a drawer type emergency escape which can be safely and positively locked in both the storaged and extended position.

Another object of the present invention is to provide a drawer type emergency escape which affords a number of persons to evacuate in a brief time and which allows persons to evacuate safely without striking them with terror even under gust of wind conditions.

BRIEF DESCRIPTION OF THE DRAWINGS

The above and other objects and attendant advantages of the present invention will be more readily apparent to those skilled in the art from the following description when read in connection with the accompanying drawings, in which.

DETAILED DESCRIPTION OF THE INVENTION

Figure 1:
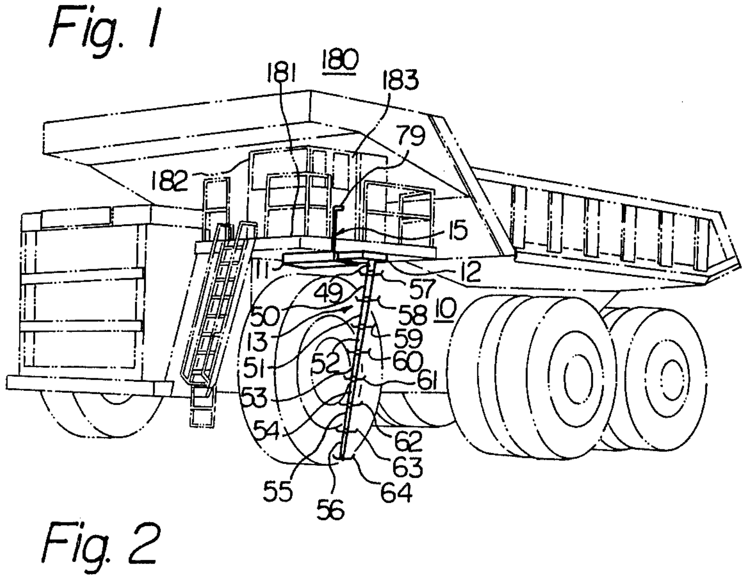
FIG. 1 is a perspective view of one embodiment of the drawer type emergency escape of the present invention mounted on the cab floor of a super-large size dump truck showing the escape in its operative position.

The present invention will be now described referring to the accompanying drawings and more particularly, to FIGS. 1 through 23 in which the first embodiment of the drawer type emergency escape constructed in accordance with the present invention is shown. The emergency escape is generally shown with reference numeral 10 and applied to a super-large size dump truck 180.

The drawer type emergency escape 10 is adapted to be mounted on a suitable support portion of the dump truck 180. In FIG. 1, the emergency escape is attached to the cab floor 181 which is positioned on the forward portion of the truck and supports the cab 182 thereon and more particularly, the emergency escape is attached to the underside of the cab floor 181 in a position adjacent to the side edge of the cab floor 181 where the cab 182 is provided with the access door 183.

The drawer type emergency escape 10 compises a rectangular stowage box 11 secured to the underside of the cab floor 181 by means of set screws with one open end thereof in alignment with the above-mentioned side edge of the cab floor 181, a rectangular slidable frame 12 for slidable movement between a first or retracted position in which the frame 12 is storaged in the stowage box 11 and a second or extended position in which the frame 12 emerges partially out of the box, an extensible escape means 13 mounted on the slidable frame 12 for movement between a first position in which the escape means is received within the frame in its contracted condition and a second position in which the escape means extends downwardly out of the frame, an escape means support means 14 for supporting the escape means and a shift mechanism 15 adapted to extend the slidable frame 12 out of the stowage box 11 when the emergency escape is employed and retract the slidable frame into the stowage box when the emergency escape is not employed.

The drawer type emergency escape 10 further includes a locking mechanism 16 adapted to lock the slidable frame 12 on the stowage box 11 in the storaged position when the escape is not employed, a detent mechanism 17 adapted to lock the slidable frame 12 on the stowage box 11 in the extended position when the escape is employed, a shift-locking mechanism 18 for the shift mechanism 15 and a ratchet release mechanism 20 for the escape means 13.

The stowage box 11 is secured to the underside of the cab floor 181 by means of set screws so as to position the opening 29 at the open end thereof right below the above-mentioned side edge of the cab floor.

Figure 3:
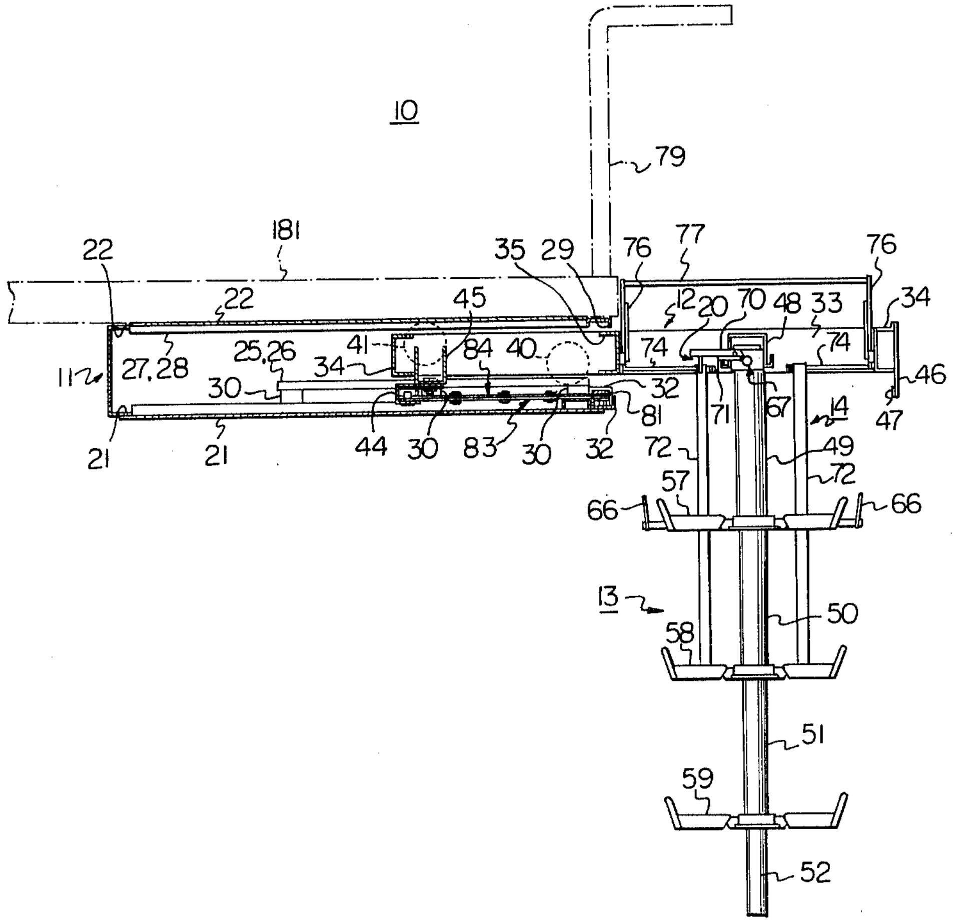
FIG. 3 is a fragmentary sectional view on a further enlarged scale of said drawer type emergency escape as seen from the front of said dump truck of FIG. 1.
Figure 7:
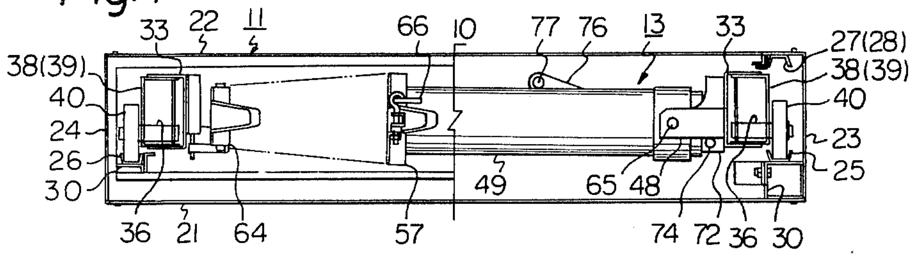
FIG. 7 is a cross-sectional view taken along substantially the line 7—7 of FIG. 5.

As more clearly shown in FIGS. 3 and 7, the stowage box 11 includes a pair of lower guide rails 25, 26 extending along the opposite and spaced side walls 23, 24, respectively, and secured to the inner surface of the bottom wall 21 with a plurality of spacers 20 interposed therebetween and a pair of upper guide rails 27, 28 extending along the side walls 23, 24, respectively, and secured to the inner surface of the top wall 22 in opposition to the lower guide rails 25, 26, respectively.

Figure 8:
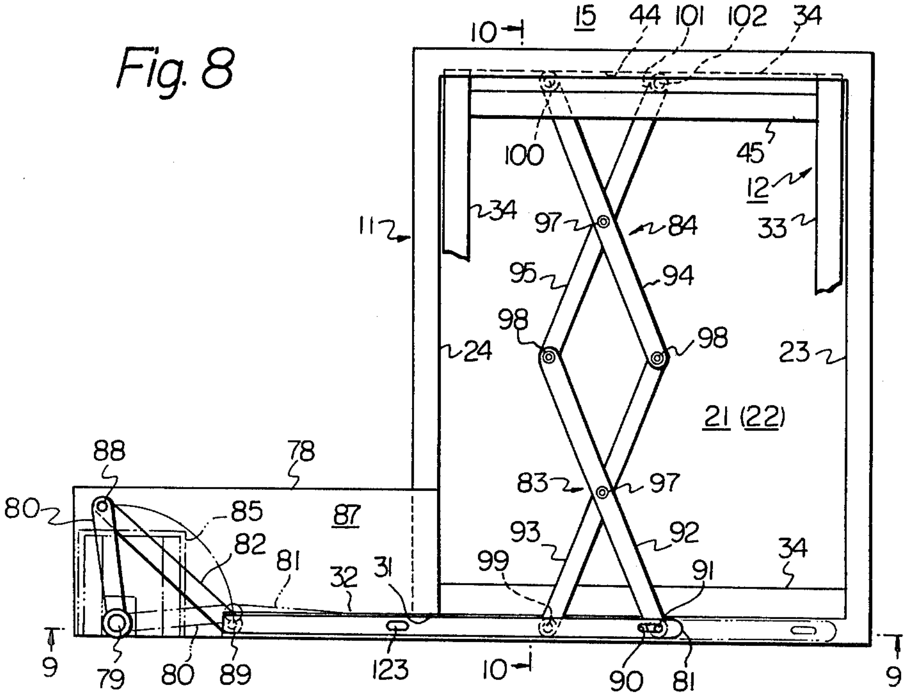
FIG. 8 is a plan view of the shift mechanism employed in the drawer type emergency escape as shown in FIG. 1.
Figure 9:
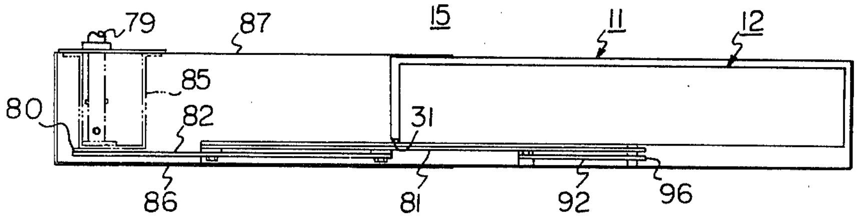
FIG. 9 is a cross-sectional view taken along substantially the line 9—9 of FIG. 8.
Figure 10:
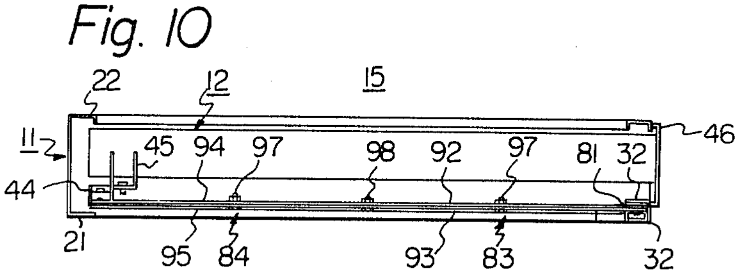
FIG. 10 is a cross-sectional view taken along substantially the line 10—10 of FIG. 8.

Furthermore, as more clearly shown in FIGS. 8 and 9, the stowage box 11 comprises a link guide groove 32 for a slide shift link 81 associated with the shift mechanism 15 adjacent to the opening 29 of the stowage box 11 and the link guide groove extends from the stowage box 11 through a hole 31 in the box to a drive arm case 78 and is secured to the inner surfaces of the bottom walls 21, 86 of the stowage box 11 and drive arm case 78, respectively.

And the slidable frame 12 comprises a pair of side frame members 33, 33 and a pair of cross frame members 34, 34 extending at right angles to the side frame members and each secured at the opposite ends to the associated ends of the side frame members to form a rectangular structure. A reinforcing cross frame member 35 extends between and is secured at the opposite ends to the side frame members 33, 33 intermediate between the cross frame members 34, 34.

Each of the side frame members 33 has a pair of spaced fore and rear box-shaped brackets 38, 39 extending outwardly from the outer side thereof in different heights and the fore and rear pins 36, 37 extending outwardly from the outer side of the associated side frame member through the fore and rear brackets 38, 39, respectively. Upper and lower rollers 40, 41 are rotatably mounted on the pins 36, 37, respectively, and the lower rollers 40, 40 are rotatably received in the lower guide rails 25, 26, respectively, whereas the upper rollers 41, 41 are rotatably received in the upper guide rails 27, 28, respectively.

With the lower and upper rollers 40, 41 rotatably received in the lower guide rails 27, 28 and upper guide rails 27, 28, respectively, the slidable frame 12 is extended out of and retracted into the stowage box 11 being guided along the lower and upper guide rails 25, 26 and 27, 28. However, when the slidable frame 12 is extended out of the stowage box 11, a projection 42 extending downwardly from the bottom wall of the frame 12 abuts against a stopper 43 on the inner surface of the bottom wall of the stowage box 11 and the stopper locks the slidable frame 12 in the extended position in cooperation with the detent mechanism 17.

Furthermore, the slidable frame 12 has a bracket 45 secured to the rear cross frame member 34 and a tong guide groove means 44 secured to the bracket 45 for guiding the rear end of a set of extensible tongs 84 in its horizontal movement along the associated cross frame member 34.

The slidable frame 12 further has a cover plate 46 secured to the front end face thereof. Thus, when the slidable frame 12 has been retracted into the stowage box 11, the cover plate 46 closes the opening 29 to maintain the stowage box 11 sealed. Of course, the cover plate 46 has a weather strip 47 which is adapted to seal the stowage box 11 when the slidable frame 12 is received or retracted in the stowage box 11.

As more clearly shown in FIGS. 3 to 7 inclusive, the escape means 13 has a bracket 48 at the inner end thereof and the bracket is secured to the slidable frame 12 and more particularly, to one of the side frame member 33 of the slidable frame 12 so that the escape means 13 is telescopically contracted or received into the slidable frame 12 as the slidable frame is retracted into the stowage box 11 and telescopically extended out of the escape means 13 as the slidable frame 12 is extended out of the stowage box 11. When the escape means 13 is telescopically contracted and extended, the inclination angle of the escape means 13 with respect to the slidable frame 12 is regulated by a pair of ropes 66, 66 each attached at one end to the slidable frame 12 and at the other end to the escape means 13.

The escape means 13 comprises eight hollow slidable pipes 49, 50 . . . 56 of elliptical cross-section which are telescopically connected together and reduced in cross-section area on the order and rungs 57, 58 . . . 64 which are attached to the lower ends of the pipes 49, 50 . . . 56, respectively, and extend transversely of the respectively associated pipes. The topmost or largest cross-section area slidable pipe 49 is rotatably mounted on the bracket 48 through a support shaft 65. Thus, as the slidable frame 12 is extended out of the stowage box 11, the escape means 13 is allowed to telescopically extend until the lowermost slidable pipe 56 contacts or is positioned closely adjacent to the ground whereby the escape means 13 is suspended from the slidable frame 12.

Figure 4:
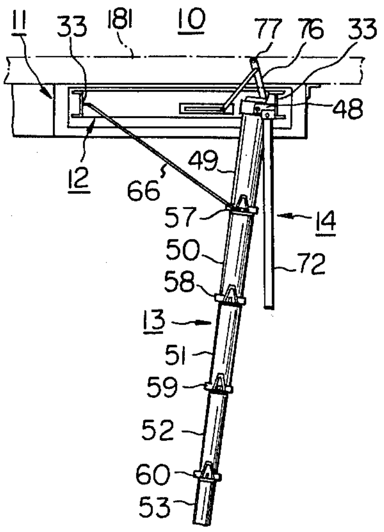
FIG. 4 is a fragmentary sectional view on an enlarged scale of said drawer type emergency escape as seen from one side of said dump truck of FIG. 1.

The slidable pipes 49, 50 . . . 56 of different cross-section areas are so telescopically connected to each other that when the escape means 13 is employed, the uppermost pipe 49 is rotated about the support shaft 65 in the counter-clockwise direction as seen in FIG. 4 and the pipes 50, 51 . . . 56 are allowed to slidably extend out of the respectively adjacent upper pipes 49, 50 . . . 55 by their gravity and when the escape means is not employed, the pipes 50, 51 . . . 56 are slidably received into the respectively adjacent upper pipes 49, 50 . . . 55 and the uppermost pipe 49 is rotated about the support shaft 65 in the clockwise direction as seen in FIG. 4 until the escape means 13 assumes the horizontal position to be received in the slidable frame 12 in the contracted position.

The escape means 13, of course, comprises a manual hoist 67 mounted in an upper portion of the uppermost pipe 49. The manual hoist 67 includes a drum (not shown) having a ratchet mechanism 68, a wire rope (not shown) having one end anchored to the drum and the other end anchored to the lowermost pipe 56 to be wound about the drum and payed out of the drum and a brake device (not shown) which comprises a fly weight and a friction plate.

Figure 5:
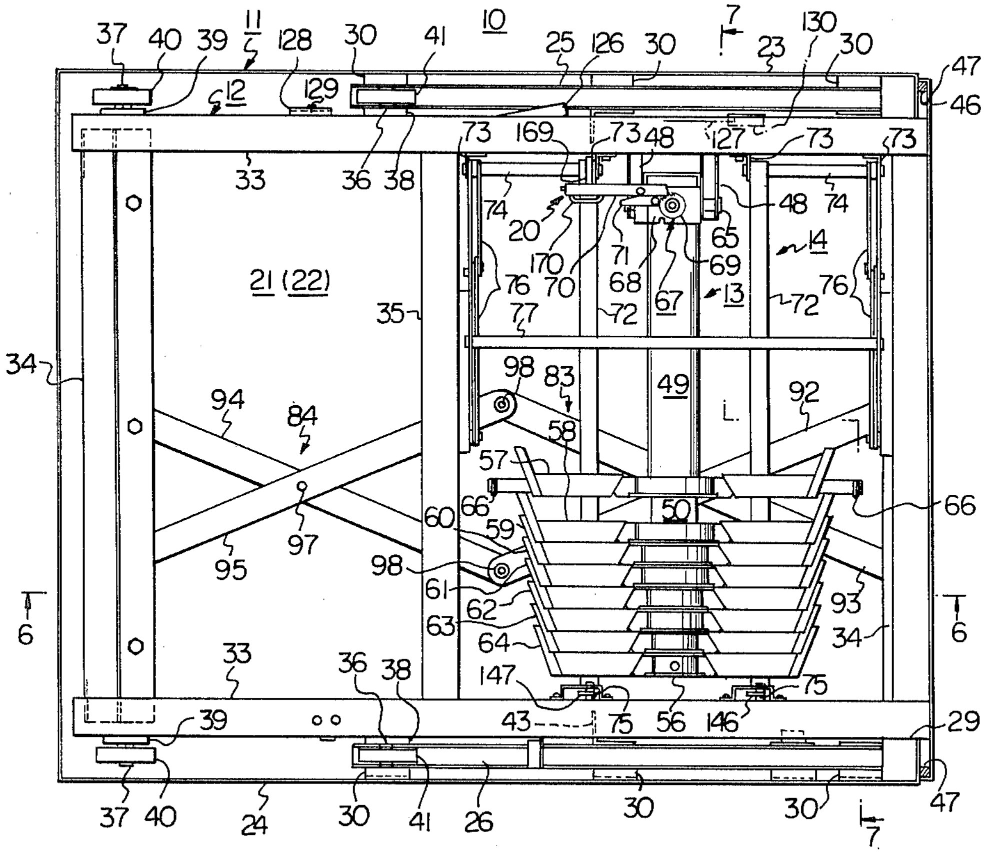
FIG. 5 is a top plan view on an enlarged scale of said drawer type emergency escape as shown in FIG. 1 showing the same in its storaged or retracted position with the top wall of the stowage box being partially cut away.
Figure 22:
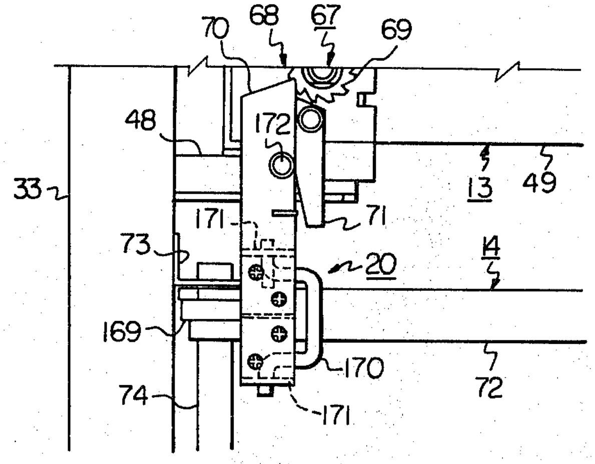
FIG. 22 is a front elevational view of the ratchet release mechanism for the escape means employed in the drawer type emergency escape as shown in FIG. 1 with a portion of the release mechanism cut away.
Figure 23:
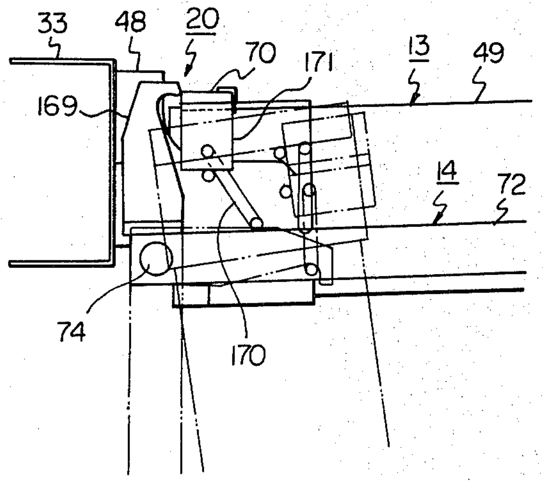
FIG. 23 is a side elevational view of the ratchet release mechanism of FIG. 22.

As more clearly shown in FIGS. 5, 22 and 23, the manual hoist 67 includes a release lever 70 for releasing the ratchet mechanism 68 and a detent lever 71 for maintaining the ratchet mechanism 68 and accordingly, the release lever 70 in the released position so that the hoist 67 can perform the rope winding operation.

The release lever 70 is operated by a ratchet release mechanism 20 which is in turn operatively connected to the escape means support means 14. Thus, when the slidable frame 12 is extended out of the stowage box 11 and the escape means support means 14 is allowed to swing downwardly, the ratchet release mechanism 20 responds to the downward swinging movement of the support means 14 to free the release lever 70 from the ratchet 69 of the ratchet mechanism 68 associated with the hoist 67 to release the ratchet mechanism 68 whereby the escape means 13 is allowed to extend downwardly by its gravity towards the ground. The downward extending rate of the escape means 13 is controlled by the action of the brake device.

When the extended escape means 13 is to be pulled up or retracted into the slidable frame 12, the drum of the hoist 67 is rotated by a handle (not shown) in the wire rope winding-up direction to cause the pipes 49, 50 . . . 55 to be telescopically or slidably received into the respectively adjacent upper pipes 50, 51 . . . 56.

When the slidable frame 12 is received in the stowage box 11, the escape means 13 is received within the slidable frame 12 in the contracted and horizontal position. On the other hand, when the slidable frame 12 is pulled or extended out of the stowage box 11, the escape means support means 14 is caused to swing downwardly to rotate the escape means 13 downwardly about the support shaft 65 to the ground. In order to perform the above-mentioned function, the escape means support means 14 comprises a pair of support bars 72, 72.

Figure 6:
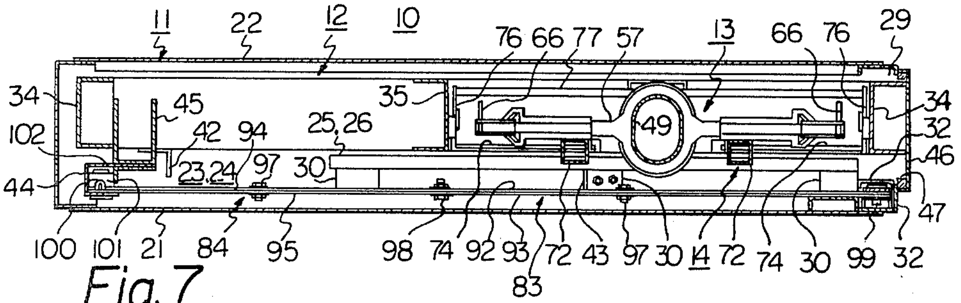
FIG. 6 is a cross-sectional view taken along substantially the line 6—6 of FIG. 5.

As shown in FIGS. 5, 6 and 7, the pair of support bars 72, 72 which each comprise a hollow square bar are disposed on the opposite sides of the hollow slidable pipes 49, 50 . . . 56 and pivoted to one of the side frame members 33 of the slidable frame 12. More particularly, the support bars 72 are each secured at one end to its associated support shaft 74 which is in turn rotatably supported at the opposite ends in its associated pair of brackets 73, 73 attached to the above-mentioned one side frame member 33. The other or leading end of each of the support bars 72 has an engaging pawl 75 secured thereto and the pawl is adapted to engage a rocking hook 146 or 147 for the escape means support means locking mechanism 19 mounted on the other side frame member 33 of the slidable frame 12.

As more clearly shown in FIGS. 2 to 5 inclusive, each of the support shafts 74 has a pair of link support struts 76 attached to the opposite or outer end and a grip bar 77 extends between and is secured to the lower link support struts of the two support shafts 74 so that when the slidable frame 12 is extended out of the stowage box 11, the link support struts 76 and grip bar 77 are erected on the slidable frame to thereby provide handle means to persons who transfer from the cab floor 181 onto the rung 57.

As more clearly shown in FIGS. 1, 2, 5, 6, 7, 8, 9 and 10, the shift mechanism 15 comprises a drive arm 80 disposed within a drive arm case 78 juxtaposed with the stowage box 11 and secured to the lower end of a shift handle 79, a slide shift link 81 reciprocally and slidably received at one end in the link guide groove 32 with the other end extending through the hole 31 in the stowage box 11 into the latter, a connection link 82 connecting between the drive arm 80 and slide shift link 81 and two sets of extensible tongs 83, 84.

Figure 2:
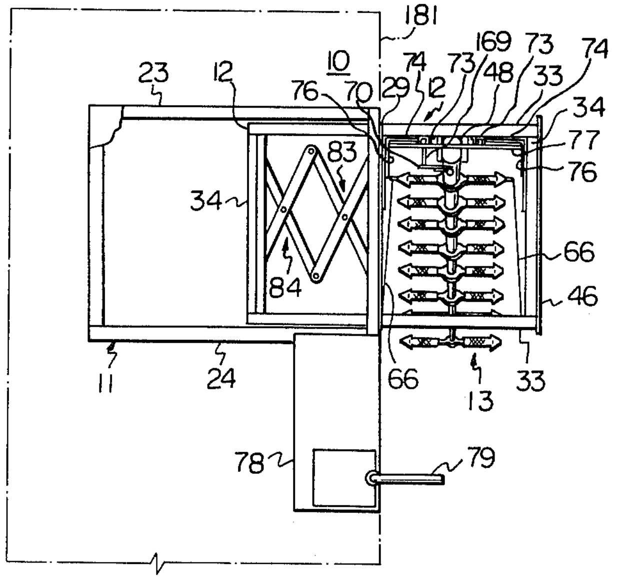
FIG. 2 is a top plan view on an enlarged scale of said drawer type emergency escape as shown in FIG. 1.

The shift handle 79 has the lower end portion extending into the drive arm case 78 and rotatably held in a bracket 85 and the extreme end secured to the drive arm 80. And as shown in FIGS. 1 and 2, the shift handle 79 has the upper end portion extending upwardly through the top wall 87 of the case 78 or above the cab floor 181 to be easily handled by the handle on the cab floor 181.

The leading end of the drive arm 80 is connected to the adjacent end of the connection link 82 by means of a pin 88 and the other end of the connection link 82 is connected to the rear end of the slide shift link 81 by means of a pin 89.

The slide shift link 81 has a slot 90 formed at the leading or right-hand end for receiving a pin 91 which pivotally connects the leading end of the slide shift link 81 to one of the tong members 92 of the fore set of extensible tongs 83.

The lower end of the pin 91 rotatably supports a roller 96 which is rotatably received in the link guide groove 32 so that the slide shift link 81 is smoothly guided along the link guide groove 32 for reciprocal and slidable movement.

The two sets of extensible tongs 83, 84 each comprise a pair of tong members or tong links 92, 93 or 94, 95 pivotably connected to each other by means of a bolt-nut unit 97 and the two sets of extensible tongs 83, 84 are pivotally connected to each other by means of bolt-nut units 98 so that the two sets of tongs 83, 84 can extend and contract simultaneously.

As more clearly shown in FIGS. 6, 8, 9 and 10, the fore set of tongs 83 has the lower or forward end of the tong member 93 pivotally connected to the link guide groove 32 by means of a bolt 99.

On the other hand, the rear set of tongs 84 has the upper or rear end of the tong member 94 pivotally connected to the tong guide groove 44 by means of a bolt 100 as shown in FIGS. 6, 8, 9 and 10 and the rear end of the tong member 95 rotatably supports a roller 101 by means of a bolt-nut unit 102.

The roller 101 is rotatably received in the tong guide groove 44 to smoothly guide the rear end of the tong member 95 along the tong guide groove 44 for reciprocal and slidable movement whereby the two sets of tongs 83, 84 can be smoothly extended and contracted.

When the drawer type emergency escape is not employed, the locking mechanism 16 locks the slidable frame 12 on the stowage box 11 in the retracted position so as to prevent the frame from inadvertently extending out of the stowage box 11 when the escape is not employed. As more clearly shown in FIGS. 11 and 12, the locking mechanism includes a pair of rocking type bars 103, 104 rotatably mounted on pins 114, 114 which are in turn supported on brackets 112, 113 secured to the top wall 22 of the stowage box 11, a pair of bar receiving openings 105, 106 formed in the side frame members 33, 33 of the frame 12 for receiving the bars 103, 104, respectively, an interlocking rod 107 for rotating the bars 103, 104 about the associated pins 114, 114, a drive plate 108 adapted to be operated by the slide shift link 81, a movement transmission plate 109 for operating the interlocking rod 107, a connection rod 110 operatively connecting between the transmission plate 109 and drive plate 108 and a return spring 111 normally urging the interlocking rod 110 to the initial position.

The interlocking rod 107 comprises hangers 116, 117 reciprocally and slidably mounted on the top wall 22 of the stowage box 11 by means of a plurality of hat-shaped brackets 115 for rotating the rocking type bars 103, 104 about the pins 114. The leading end portion of the interlocking rod 107 extends downwardly into the drive arm case 78 and has a gongue piece 118 integrally formed at the extreme lower end and the other or rear end of the interlocking rod 107 has one end of the return spring 111 anchored thereto.

The drive plate 108 and movement transmission plate 109 are disposed within the drive arm case 78 and mounted by means of bolt-nut means 120 on a grooved bracket 119 which is in turn secured to one of the side walls of the stowage box 11.

The drive plate 108 is rotatably supported by a lower pin 121 on the bracket 119 and adapted to be received in a slit 123 formed in the slide shift link 81 when the slidable frame 12 is received in the stowage box 11.

And the movement transmission plate 109 has a pawl 124 which is adapted to push a tongue piece 118 so as to further transmit the movement transmitted thereto from the drive plate 108 through the connection rod 110 to the interlocking rod 107.

The detent mechanism 17 is adapted to lock the slidable frame 12 on the stowage box 11 in the extended position and prevent the slidable frame 12 from inadvertently retracting into the stowage box 11 when the escape is employed. As more clearly shown in FIGS. 12, 14 and 15, the detent mechanism 17 is mounted on the above-mentioned one side frame member 33 of the slidable frame 12.

Figure 13:
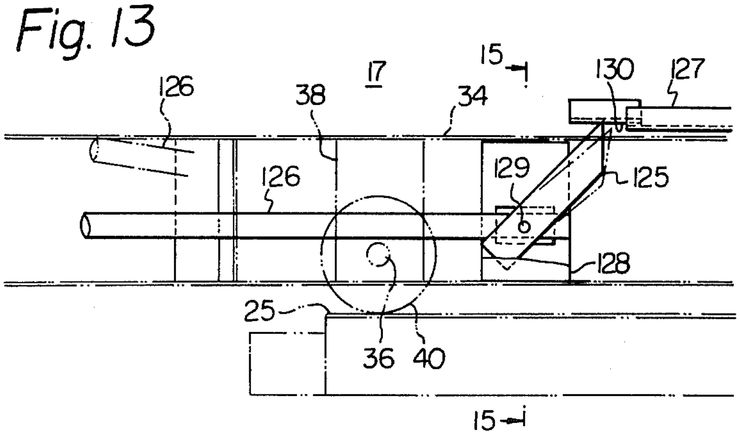
FIG. 13 is a front elevational view of the detent mechanism for the prevention of the slidable frame from inadvertent extending employed in the drawer type emergency escape as shown in FIG. 1.
Figure 14:
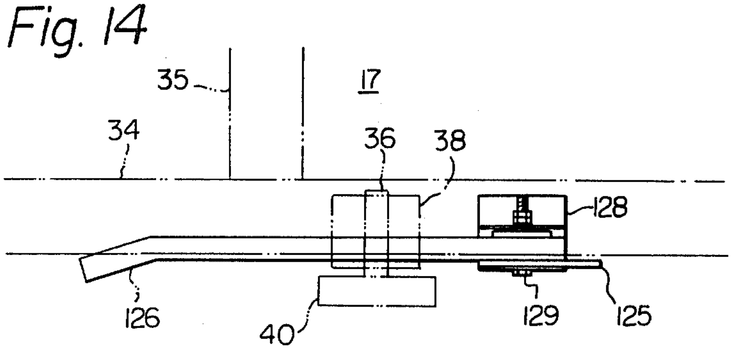
FIG. 14 is a top plan view of the detent mechanism of FIG. 13.
Figure 15:
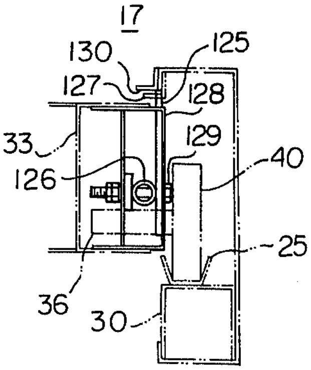
FIG. 15 is a cross-sectional view taken along substantially the line 15—15 of FIG. 13.

The detent mechanism 17 comprises a rotary pawl 125 mounted on the outer surface of the above-mentioned one side frame member 33 in the rear portion of the mechanism, a balance bar 126 adapted to normally urge the pawl 125 in the counter-clockwise direction as seen in FIG. 13 and a stepped guide plate 127 mounted on the top wall 22 of the stowage box 11 in the rear portion of the latter along the above-mentioned one side frame member 33.

The rotary pawl 125 and balance bar 126 are secured to a bolt 129 which is in turn rotatably supported in a bracket 128 secured to the outer surface of the one side frame member 33 and the pawl and bar are disposed at a predetermined angular relationship to each other. One or the leading end of the rotary pawl 125 is normally urged to contact the guide plate 127 by the action of the balance bar 126. As a result, when the slidable frame 12 is extended out of and retracted into the stowage box 11, the rotary pawl 125 is carried along the guide plate 127 by the moving slidable frame 12 with the leading end of the pawl in contact with the guide plate 127. And as seen from FIG. 13, the guide plate 127 is provided with a step 130 in a position which corresponds to the position where the slidable frame is pulled or extended out of the stowage box 11.

Thus, when the slidable frame 12 is pulled or extended out of the stowage box 11, since the leading end of the rotary pawl 125 is positioned at the step 130 on the guide plate 127, the slidable frame 12 is not retracted into the stowage box 11 and maintained in its extended position. And when the balance bar 126 is raised to the two dot-chain position as shown in FIG. 13, the leading end of the rotary pawl 125 is disengaged from the step 130 so that the slidable frame 12 is allowed to retract into the stowage box 11.

Figure 16:
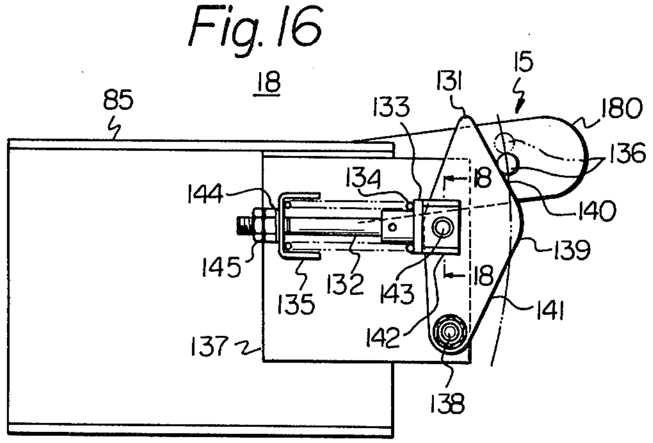
FIG. 16 is a plan view of the shift-locking mechanism employed in the drawer type emergency escape as shown in FIG. 1.
Figure 17:
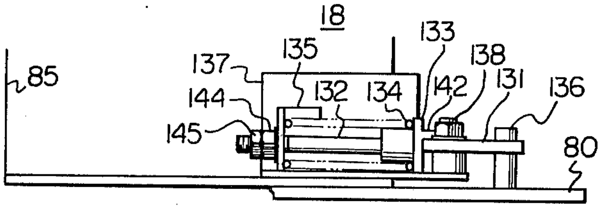
FIG. 17 is an elevational view of the shift-locking mechanism of FIG. 16.
Figure 18:
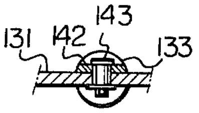
FIG. 18 is a cross-sectional view taken along substantially the line 18—18 of FIG. 16.

The shift-locking mechanism 18 is adapted to retain the shift mechanism 15 in the non-shifted and shifted positions which correspond to the retracted and extended positions of the slidable frame 12, respectively and as shown in FIGS. 16, 17 and 18, the shift-locking mechanism 18 comprises a rotary locking plate 131 normally urged to contact an engaging pin 136 on the drive arm 80 of the shift mechanism 15, a stopper rod 132 having one end connected to the locking plate 131 by means of a pin and the other end rotatably and slidably supported on a holder 135 and a compressive spring 134 disposed between the flange 133 of the stopper rod 132 and the holder 135 in coaxial relationship to the stopper rod 132.

The locking plate 131 is rotatably or rockably supported on a strut-shaped shaft 138 on a mounting plate 137 which is in turn secured to the bracket 85.

The locking plate 131 comprises a locking ram 140 and a shift ramp 141 positioned on the opposite sides of a transition point 139 and is connected to the connection plate 142 of the stopper rod 132 by means of a pin 143.

The other end portion of the stopper rod 132 extends through a hole (not shown) in the holder 135 and is threaded at the extreme end where a nut 144 and a lock nut 145 are threadably received to thereby regulate the maximum rotation angle of the locking plate 131 towards the engaging pin 136.

Thus, when the shift mechanism 15 and more particularly, the drive arm 80 is positioned in the non-shifted position, the engaging pin 136 rides on the locking ram 140 and the drive arm 80 is held against the locking ramp 140 under the action of the compressive spring 134 whereby the shift mechanism 15 is locked in the non-shifted position.

And as the drive arm 80 is rotated in the clockwise direction as seen in FIG. 16 against the force of the spring 134 by the operation of the shift handle 79, the engaging pin 136 carried by the drive arm 80 is moved from the locking ramp 140 to the shift ramp 141 beyond the transition point 139. As the shift handle 79 is further rotated, the engaging pin 136 clears the shift ramp 141 and is released from the restraining force of the locking mechanism 18 and as the result, the shift mechanism 15 is positioned in the shifted position.

Thus, the engaging pin 136 is held against the locking ramp 140 or moved to the shift ramp 141 depending upon whether the shift handle 79 is rotated or not so as to apply any excess compression force above a predetermined value to the compressive spring 134. Since the drive arm 80 is restrained in this way, the shift mechanism 15 is locked in either the non-shifted position or shifted position.

Figures 19, 20, 21:
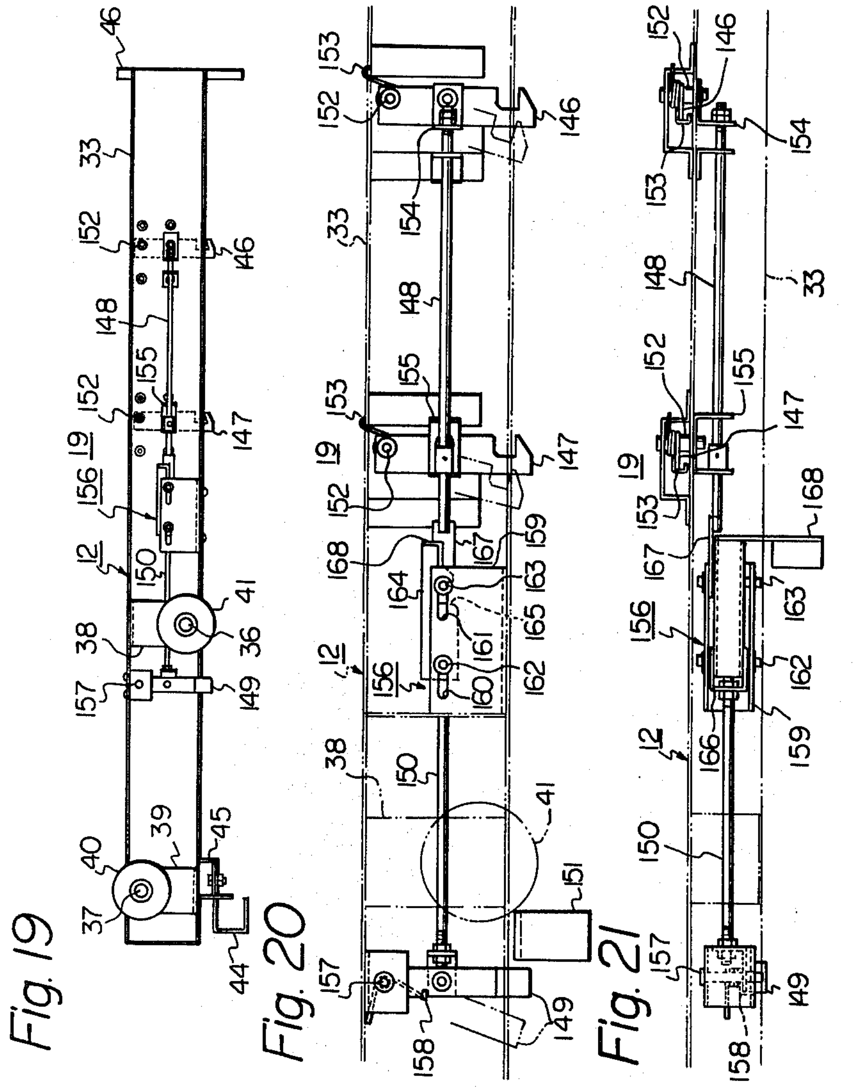
FIG. 19 is a front elevational view of the escape means support means locking mechanism employed in the drawer type emergency escape as shown in FIG. 1 showing the arrangement of the slidable frame.
FIG. 20 is a front elevational view of the escape means support means locking mechanism of FIG. 19.
FIG. 21 is a top plan view of the escape means support means locking mechanism of FIG. 19.

In order to hold the escape means 13 in its telescopically contracted position when the slidable frame 12 is retracted into the stowage box 11, the escape means support means locking mechanism 19 is mounted on the other slide frame member 33 of the slidable frame 12 so as to maintain the slidable frame 12 in the horizontal and locked position as more clearly shown in FIGS. 19, 20 and 21.

The escape means support means locking mechanism 19 includes a pair of rocking hooks 146, 147, an interlocking rod 148 interlocking between the rocking hooks 146, 147, an operation lever 149, an operation rod 150 connecting the operation lever 149 to the interlocking rod 148 through a connection mechanism 156 and a stopper 151 mounted within the stowage box 11.

The rocking hooks 146, 147 are rotatably mounted on the other side frame member 33 by means of pins 152, 152 and normally urged into the locked position or the upright position as shown in FIG. 20 by their return springs 153, 153.

The interlocking rod 148 is connected at one end to the rocking hook 146 through a bracket 155, in an intermediate portion to the rocking hook 147 through a bracket 155 and at the other end to the connection mechanism 156.

The operation lever 149 is rotatably mounted on the other side frame member 33 by means of a pin 157 and normally urged to the upright position as seen in FIG. 20 under the action of a return spring 158.

The operation lever 149 is mounted on the other side frame member 33 in such a position that the lever 149 abuts against the stopper 151 just before the projection 42 abuts against the stopper 43 as the slidable frame 12 is pulled or extended out of the stowage box 11. In such a case, the movement of the operation lever 149 is transmitted to the interlocking rod 148 through the operation rod 150 and connection mechanism 156.

The connection mechanism 156 is designed to provide a play between the interlocking rod 148 and operation rod 150 to allow the pawls 75 on the support bars 72 to engage the rocking hooks 146, 147 as the slidable frame 12 is retracted into the stowage box 11 and for the purpose, the connection mechanism 156 includes a holder 159 of grooved cross-section secured to the other side frame member 133, a pin 162 received in a slot 160 formed in the holder 149 at the end thereof facing the operation lever 149, a pin 163 received in a slot 161 formed in the holder 159 at the end thereof facing the rocking hook 147, a connection hook 164 rotatably attached to the pin 162 and having a notched hook portion 165 for engaging the pin 163 and a connection plate 167 connecting the pin 163 to the interlocking rod 148.

The connection hook 164 has an operation handle 168 integrally welded to the leading end of the hook.

With the above-mentioned construction of the connection hook 164, when the notched hook portion 165 in the connection hook 164 engages the pin 163, the movement of the operation lever 149 is directly transmitted to the rocking hooks 146, 147 and when the notched hook portion 165 in the connection hook 164 is disengaged from the pin 163, a play is provided between the operation lever 149 and rocking hooks 146 so that the engaging pawls 75 on the support bars 72 can engage the rocking hooks 146, 147.

As more clearly shown in FIGS. 20, 22 and 23, the ratchet release mechanism 20 associated with the escape means 13 comprises a release hook 169 secured to the support shaft 74 supporting one of the support bars 72 and a free ring 170 attached to the release lever 70 of the ratchet mechanism 68.

As seen from FIG. 23, the release hook 169 is secured to the associated support shaft 74 at the angle of 90° relative to the support bar 72 and the free ring 170 is formed by bending a length of wire and held on a pair of brackets 171, 171 which are in turn screwed to the release lever 70.

Thus, as the slidable frame 12 is extended out of the stowage box 11 by the shift mechanism 15 and the escape means support means locking mechanism 19 is released, the support bars 72 and escape means 13 are allowed to rotate downwardly by their gravities and thus, just before the support bars 72 assume the vertical position as the support bars swing or rotate downwardly from the horizontal position, the release hook 169 engages the free ring 170 carried by the escape means 13 as the latter swings downwardly to rotate the release lever 70 about the pin 172 whereby the release lever 70 is disengaged from the ratchet 69 to release the ratchet mechanism 68 of the hoist 67. As the result, the escape means 13 is allowed to telescopically extend to the ground by its gravity subjected to the braking force of the brake device.

Now, assuming that the driver of the dump truck tries to evacuate from the cab 182 of the truck to the ground by the use of the emergency escape 10 as described hereinabove upon the occurrence of any emergency, first of all, the driver rotates the shift handle 79 of the shift mechanism 15 to move the engaging pin 136 from the locking ramp 140 to the shift ramp 141 beyond the transition point 139 of the locking plate 131 against the force of the compressive spring 134 of the shift-locking mechanism 18.

As the shift handle 79 is rotated in the manner mentioned just above, the drive arm 80 is rotated and the movement of the drive arm is transmitted to the sets of extensible tongs 83, 84 through the slide shift link 81. In such a case, the drive plate 108 received in the slit 123 in the slide shift link 81 is rotated upwardly about the lower pin 121. As the drive plate 108 rotates upwardly, the movement transmission plate 109 connected to the drive plate 108 through the connection rod 110 is rotated upwardly about the upper pin 122. Thus, since the pawl 124 on the rotation movement transmission plate 109 pushes the tongue piece 118 of the interlocking rod 107, the interlocking rod 107 is moved leftwards as seen in FIG. 11 against the force of the return spring 111.

Figure 11:
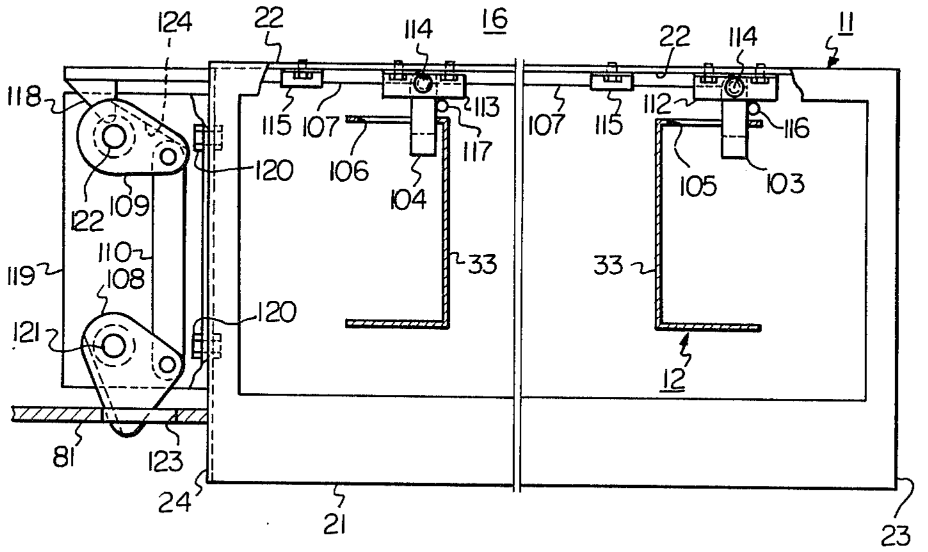
FIG. 11 is a front elevational view of the locking mechanism for locking the slidable frame in the storaged position employed in the drawer type emergency escape as shown in FIG. 1.

As the interlocking rod 107 moves leftwards, the rocking bars 103, 104 are rotated about the pins 114 so as to rotate the hangers 116, 117 of the interlocking rod 107 in the clockwise direction as seen in FIG. 11 to thereby disengage the rocking bars 103, 104 from the bar receiving openings 105, 106 in the side frame member 33, respectively whereby the locking mechanism 16 is unlocked and the slidable frame 12 can be extended out of the stowage box 11.

As the locking mechanism 16 is unlocked by the slide shift link 81, in spite of the fact that the slide shift link 81 is moved rightwards along the link guide groove 32 as seen in FIG. 8, the two sets of extensible tongs 83, 84 connected to the slot 90 in the slide shift link 81 are maintained in their extended position.

As the slide shift handle 79 is further rotated, since the slide shift link 81 is further moved rightwards along the link guide groove 32 as seen in FIG. 8 by the drive arm 80 and connection link 82, the two sets of extensible tongs 83, 84 are contracted and as the extensible tongs 83, 84 are contracted, the slidable frame 12 is extended out of the stowage box 11.

When the slide shift handle 79 has been rotated by, substantially 90°, the slidable frame 12 has been fully extracted out of the stowage box 11 whereupon the projection 42 on the slidable frame 12 abuts against the stopper 43 on the stowage box 11 and the rotary pawl 125 is positioned on the step 130 of the guide plate 127 by the balance bar 126. Since the detent mechanism 17 is operated in the manner mentioned hereinabove, the slidable frame is locked on the stowage box 11 in the extended position.

On the other hand, since the operation lever 149 on the escape means support means locking mechanism 19 abuts against the stopper 151 on the stowage box 11 just before the projection 42 on the slidable frame 12 abuts against the stopper 43 on the stowage box 11 and the operation lever 149 is rotated about the pin 157 in the clockwise direction as seen in FIG. 20 against the force of the return spring 153, the rocking hooks 146, 147 are also rotated about the pins 152 in the clockwise direction from the operation handle 149 through the operation rod 150, connection mechanism 156 and interlocking mechanism 148 against the force of the return springs 153.

Thus, since the engaging pawls 75 are disengaged from the rocking hooks 146, 147, respectively, the support bars 72 are allowed to swing downwardly by their gravity and the escape means 13 is also allowed to swing downwardly about the support shaft 65 on the bracket 48 by its gravity.

As the support bars 72 approach to their vertical position during the downward swinging movement from the horizontal locked position, the release hook 170 pulls the free ring 170 downwardly and thus, the release lever 70 is rotated about its pin to be disengaged from the ratchet 68 of the hoist 67 whereby the ratchet 68 of the hoist 67 is released.

Therefore, as more clearly shown in FIGS. 1 to 4 inclusive, the escape means 13 extends downwardly to the ground by its gravity subjected to the braking force of the brake device. At this time, the link struts 76 are erected and the grip bar 77 is positioned on the slidable frame 12.

Thereafter, the driver grips the grip bar 77 and transfers from the cab floor 181 onto the now extended escape means 13 to ride on the rung 57. The driver then descends down the successively lower rungs to the ground from where the driver moves to a safer place.

In an inspection to be performed after the use of the emergency escape, if it has been found that the escape 10 has no defect and performs properly, first of all, the detent lever 71 is manipulated to disengage the release lever 70 from the ratchet 69. With the release lever 70 disengaged from the ratchet, the hoist 67 is manually driven to raise the extended escape means 13 by winding up the wire rope about the drum and thereafter, the detent lever 71 is again operated to cause the release lever 70 to engage the ratchet 69 to thereby lock the ratchet mechanism 68.

Then, the operation handle 168 of the escape means support means locking mechanism 19 is raised to disengage the notched hook portion 165 of the connection hook 164 from the rocking hook pin 163 to provide a play between the interlocking rod 148 and operation rod 150.

When the play is provided between the interlocking rod 148 and operation rod 150, the escape means 13 and the pair of support bars 72 are raised to the horizontal storage position while the escape means and support bars 72 are rotating about the support shafts 74 and the return springs 153 return the rocking hooks 146, 147 to the engagement with the engaging pawls 75 and the leading ends of the pair of support bars 72 are locked on the other side frame member 33 of the slidable frame 12 to thereby house the escape means 13, grip bar 77 and link struts 76 within the slidable frame 12 in the position as shown in FIGS. 5, 6 and 7.

At this time, the release hook 169 of the ratchet release mechanism 20 is disengaged from the free ring 170 to return to the initial position as shown in FIGS. 5 and 22.

Thereafter, the balance bar 126 is raised to disengage the rotary pawl 125 from the step 130 on the guide plate 127 so that the slidable frame 12 can be partially retracted into the stowage box 11.

Thereafter, the shift handle 79 is rotated to the initial position to extend the two sets of extensible tongs 83, 84 through the drive arm 80, connection link 82 and slide shift link 81 to fully retract the slidable frame 12 into the stowage box 11.

Figure 12:
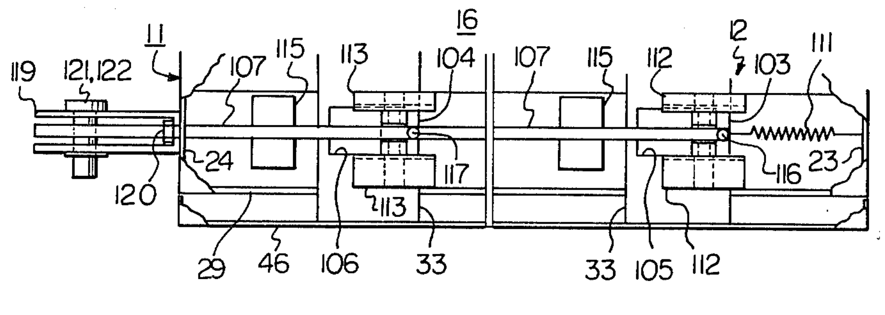
FIG. 12 is a top plan view of the locking mechanism of FIG. 11.

Thus, since the engaging pin 136 of the drive arm 80 is moved from the shift ramp 141 to the locking ramp 140 beyond the transition point 139 against the force of the compressive spring 134, the shift mechanism 15 is retained in the non-shifted position and since the drive plate 108 engages in the slit 123 of the slide shift link 81, the interlocking rod 107 is returned rightwards as seen in FIGS. 11 and 12 under the force of the spring 111 and the rocking bars 103, 104 are received in the bar receiving openings 105, 106, respectively, to lock the locking mechanism 16 in the retracted position and in other words, the slidable frame 12 is locked on the stowage box 11 in the retracted position.

By the above-mentioned operation procedure, the slidable frame 12 is retracted into the stowage box 11 and locked on the latter to return the drawer type escape 10 to the position as shown in FIGS. 5 and 8.

Figure 24:
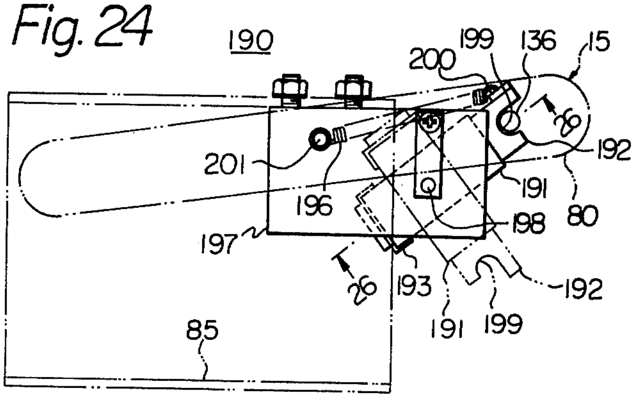
FIG. 24 is a plan view of a modification of the shift-locking mechanism employed in the drawer type emergency escape as shown in FIG. 1.
Figure 25:
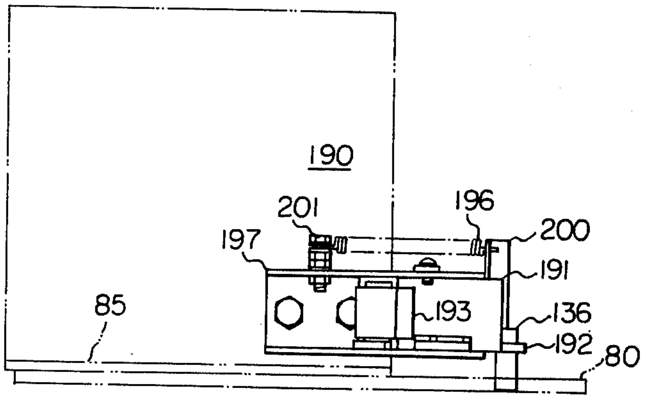
FIG. 25 is an elevational view of the shift-locking mechanism of FIG. 24.
Figure 26:
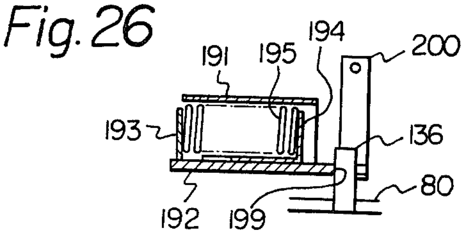
FIG. 26 is a cross-sectional view taken along substantially the line 26—26 of FIG. 24.

FIGS. 24 to 26 inclusive shows a modification of the shift-locking mechanism 18 employed in the drawer type emergency escape as mentioned hereinabove and the modified shift-locking mechanism is generally shown by reference numeral 190.

The modified shift-locking mechanism 190 is designed to restrain the shift mechanism 15 in the non-shifted position which corresponds to the storaged position of the slidable frame 12 and includes a spring stowage box 191, a slidable lock plate 192 incorporated with the stowage box 191 for reciprocal and slidable movement relative to the stowage box, a spring abutment 193, a compressive spring 195 for the slidable lock plate 192 and disposed between the spring abutment 193 and a spring compressing plate 194 and a pull spring 196 for the slidable lock plate 192.

The spring stowage box 191 is rotatably supported on a pin 198 for a channel-shaped holder 197 which is turn screwed to the shift lever bracket 85.

The slidable lock plate 192 is provided at the leading end with a pin receiving opening 199 for receiving the engaging pin 136 on the drive arm 80 of the shift mechanism 15 and the leading end of the plate 192 extends outwardly beyond the spring stowage box 191.

The pull spring 196 has one end anchored to a spring support strut 200 and the other end anchored to the bolt 201 for the holder 197 to prevent the slidable lock plate 192 from rotating in the clockwise direction together with the spring stowage box 191.

With the above-mentioned construction and arrangement of the components of the shift locking mechanism 190, when the shift mechanism 15 and accordingly, the drive arm 80 is in the non-shifted position, the compressive spring 195 and pull spring 196 cooperate with each other to urge the slidable lock plate 192 against the engaging pin 136 so as to cause the pin receiving opening 199 in the slidable lock plate 192 to engage the engaging pin 136 on the drive arm 80 to thereby restrain the drive arm 80 in the non-shifted position.

And when the shift handle 79 is operated and the drive arm 80 is rotated in the clockwise direction as seen in FIG. 24 while compressing the compressive spring 195 and pulling the pull spring 196, the slidable lock plate 192 and drive arm 80 are rotated in unison to the two dot-chain position, but when the lock plate and drive arm have reached this position, the slidable lock plate 192 is disengaged from the engaging pin 136 and restrained in the two dot-chain position by the pull spring 196. On the other hand, after the slidable lock plate 192 has disengaged from the engaging pin 136, the drive arm 80 is released from the restraint provided by the slidable lock plate 192 or the shift mechanism 15 and allowed to rotate to the shifted position. This shifted position, of course, corresponds to the extended position of the slidable frame 12.

When the shift handle 70 is again operated and the drive arm 80 is rotated from the shifted position to the non-shifted position, since the engaging pin 136 engages in the pin receiving opening 199 formed in the slidable lock plate 192 in the two dot-chain position, the drive arm 80 is rotated to the non-shifted position while compressing the compressive spring 195 and placed under the restraint provided by the shift lock mechanism 18.

Figures 27, 28, 29:
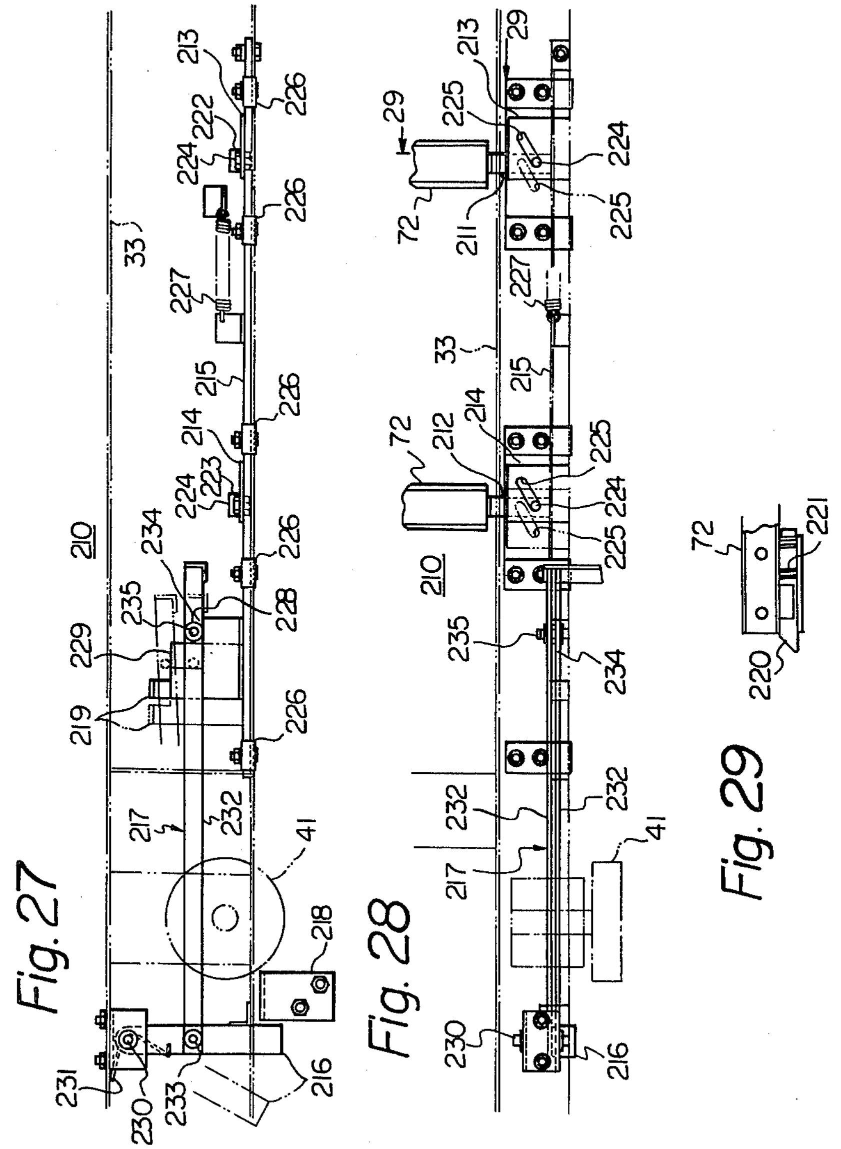
FIG. 27 is a front elevational view of a modification of the escape means support means locking mechanism employed in the drawer type emergency escape as shown in FIG. 1.
FIG. 28 is a top plan view of the escape means support means locking mechanism of FIG. 27.
FIG. 29 is a cross-sectional view taken along substantially the line 29—29 of FIG. 28.

FIGS. 27, 28 and 29 shows a further modification of the escape means support means locking mechanism 19 employed in the drawer type emergency escape as mentioned hereinabove and the further modified locking mechanism is generally shown by reference numeral 210.

The escape means support means locking mechanism 210 is mounted on the other side frame member 33 of the slidable frame 12 and includes a pair of pusher plates 211, 212, a pair of cam plates 213, 214 for reciprocally moving the pusher plates 211, 212, respectively, an interlocking rod 215 interlocking between the cam plates 213, 214, an operation rod 217 connecting the operation lever 216 to the interlocking rod 215 through a connection plate 219 and a stopper 218 disposed within the stowage box 11.

As more clearly shown in FIG. 28, since the pusher plates 211, 212 are each designed to push the engaging pawl 220 of the associated support bar 72 into the support bar 72 against the force of the spring 221, the pusher plates are mounted on the associated side frame member 33 for reciprocal movement in a direction intersecting the longitudinal axis of the side frame member at right angles. More particularly, the pusher plates 211, 212 are mounted on the flanges on the bottom of the side frame member 33 in such a position that the pusher plates project out of the openings 222, 223, respectively, which are formed in the web of the side frame member 33. And the pusher plates 211, 212 have pins 224.

The cam plates 213, 214 are mounted on the associated side frame member 33 in the positions corresponding to those of the pusher plates 211, 212, respectively and have inclined cam grooves 255 in which the pins 224 on the pusher plates 211, 212 engage.

The interlocking rod 215 has the cam plates 213, 214 attached thereto in spaced relationship along the length thereof and is mounted on a bottom flange of the associated side frame member 33 by means of a plurality of spaced guides 226 for reciprocal movement in the longitudinal direction of the side frame member. The interlocking rod 215 is normally urged to the locked position as shown in FIGS. 27 and 28 by means of a return spring 227 and has the connection plate 219 on one side of the interlocking rod adjacent to one or the left-hand end as seen in FIG. 27.

In order that the engaging pawls 220 can be smoothly inserted into the respectively corresponding openings 222, 223 in the associated side frame member 33 when the escape means 13 is retracted into the slidable frame 12, the connection plate 219 has a connection step 228 and a play step 229 so that a play can be provided between the interlocking rod 215 and operation rod 217.

The operation lever 216 is rotatably connected to the other side frame member 33 by means of a pin 230 and normally urged to the vertical position as shown in FIG. 27 by means of a return spring 231.

The operation lever 216 is mounted on the associated side frame member 33 in such a position that just before the projection 42 abuts against the stopper 43 as the slidable frame 12 is extended out of the stowage box 11, the operation lever 216 abuts against the stopper 218 and the movement of the operation lever 216 is transmitted to the interlocking rod 215 through the operation rod 217 and connection plate 219.

The operation rod comprises two elongated plate members 232 which are pivoted at one end to the operation lever 216 by means of a pin 233 with the operation lever sandwiched therebetween and have a roller 234 rotatably supported therebetween by means of a pin 235. The roller 234 is adapted to selectively engage the connection step 228 and play step 229.

The operation rod 217 has an operation handle 236 welded to the other end of the elongated plate members 232 for rotating the plate members about the pin 233 whereby the roller 234 is moved from the connection step 228 to the play step 229 and vice versa.

With the above-mentioned construction and arrangement of the components of the escape means support means 210, when the slidable frame 12 is held in the retracted position within the stowage box 11, the roller 234 is positioned on the connection step 228 of the connection plate 219, the operation lever 216 is held in the vertical position as shown in FIG. 27 under the action of the return spring 231 and the interlocking rod 215 is returned to the locked position by the action of the return spring 227 whereby the cam plates 213, 214 retract the pusher plates 211, 212 inwardly of the web of the side frame member 33 for insertion of the engaging pawls 220 on the support bars 72 into the respectively corresponding openings 222, 223 resulting in the locking of the escape means support means 14.

And when the slidable frame 12 is extended out of the stowage box 11 by the shift mechanism 15, before the projection 42 on the slidable frame 12 abuts against the stopper 43 on the stowage box 11, the operation lever 216 abuts against the stopper 218 on the stowage box 11 to rotate the operation lever 216 about the pin 230 in the clockwise direction as seen in FIG. 27 against the force of the return spring 231 and thus, the cam plates 213, 214 are also moved leftwards as seen in FIG. 27 as the interlocking rod 215 is operated through the operation rod 217 and connection plate 219.

Therefore, the pusher plates 211, 212 having their pins 224 received in the cam grooves 225 in the cam plates 213, 214 extend out through the openings 222, 223 into the inner side of the web and thus, the engaging pawls 220 are retracted into the support bars 72 against the force of the springs 221.

As the result, the support bars 72 are unlocked and allowed to swing downwardly from the horizontal position toward the vertical position to allow the escape means 13 to telescopically extend from the retracted position.

Figures 30, 31, 32:
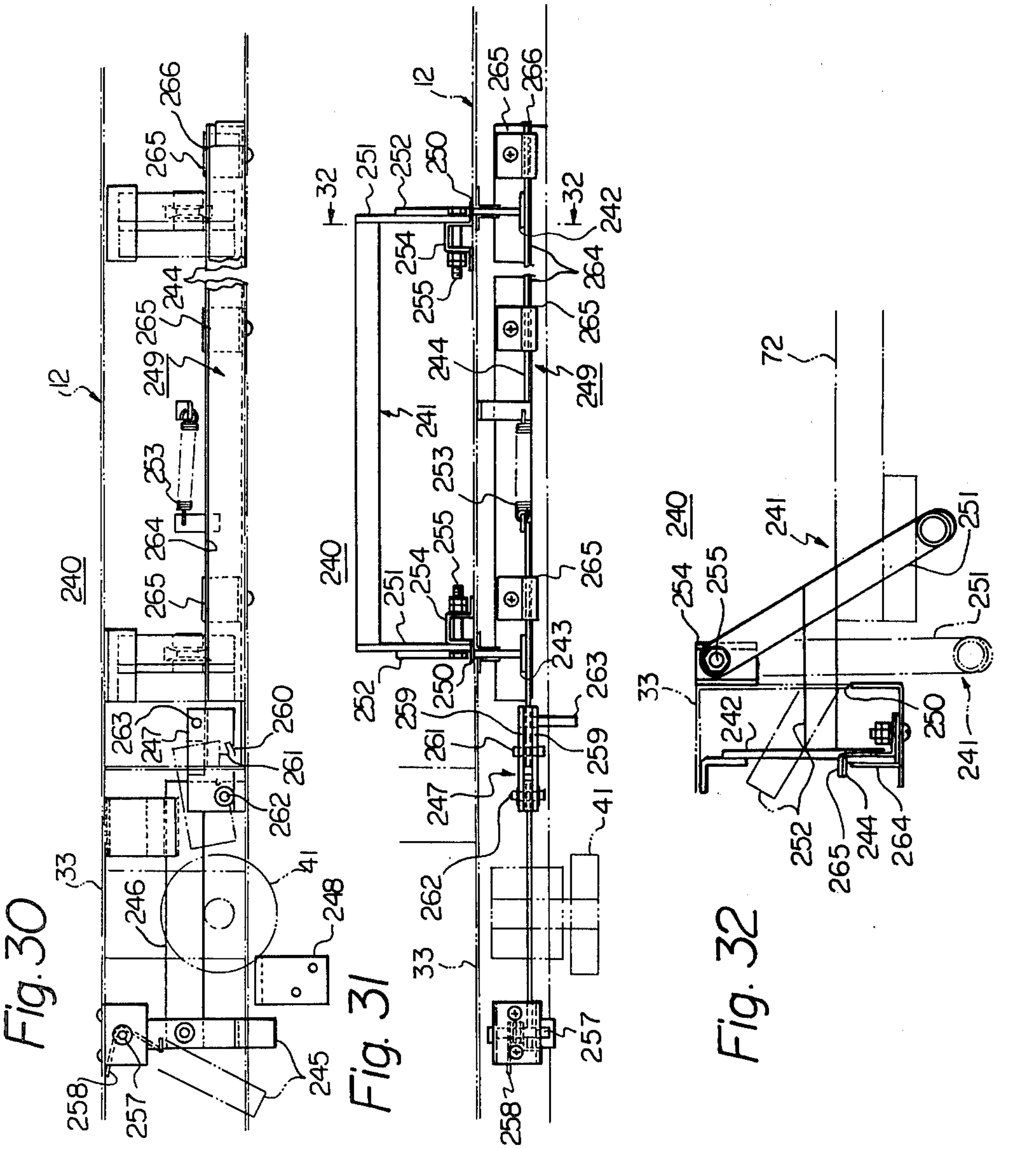
FIG. 30 is a front elevational view of a further modification of the escape means support means locking mechanism employed in the drawer type emergency escape as shown in FIG. 1.
FIG. 31 is a top plan view of the escape means support means locking mechanism of FIG. 30.
FIG. 32 is a cross-sectional view taken along substantially the line 32—32 of FIG. 31.

FIGS. 30, 31 and 32 show a modification of the escape means support means locking mechanism 19 employed in the drawer type emergency escape 10 as mentioned hereinabove and the modified locking mechanism is generally shown by reference numeral 240.

The escape means support means locking mechanism 240 is mounted on the other side frame member 33 of the slidable frame 12 and includes a swing hanger 241 rotatably mounted on the inner side of the other side frame member 33, an abutment plate interlocking rod 244 having a pair of abutment plates 242, 243 against which the pusher arms 252 of the swing hanger 241 abut, an operation lever 245, an operation rod 246 pinned at one end to the operation lever 245 and connected at the other end to the abutment plate interlocking rod 244 through a connection hook 247, a stopper 248 disposed on the stowage box 11 and a guide 249 for guiding the abutment plate interlocking rod 244 in the longitudinal direction of the side frame 33.

The swing hanger 241 is rotatably attached to a pair of brackets 254 which are in turn welded to the web of the side frame member 33 by means of bolts 255 and adapted to swing about the bolts 255 so as to engage the leading ends of the support bars 72.

The swing hanger 241 comprises hanger arms 251 from which the above-mentioned pair of pusher arms 252 extend through slits 250 formed in the web of the side frame member 33 to the abutment plates 242, 243.

When the slidable frame 12 is retracted in the stowage box 11, the abutment plates 242, 243 abut against the pusher arms 252 and engage and support the leading ends of the support bars 72 and when the slidable frame 12 is extended out of the stowage box 11, the abutment plates clear the pusher arms 252 of the swing hanger 241 whereby the swing hanger 241 is allowed to swing to the vertical position as shown in FIG. 32 by its gravity. The abutment plates 242, 243 are welded to the abutment plate interlocking rod 244 in suitably spaced positions along the length of the rod. The abutment plate interlocking rod 244 is normally urged to a stopper 266 on the guide 249.

The operation lever 245 is rotatably attached to the other side frame member 33 by means of a pin 257 and normally urged to the vertical position as shown in FIG. 30. The operation lever 245 is so positioned on the side frame member 33 that just before the projection 42 abuts against the stopper 43 as the slidable frame 12 is extended out of the stowage box 11, the operation lever 245 abuts against the stopper 43 secured to the stowage box 11. Such movement of the operation lever 245 is transmitted to the abutment plate interlocking rod 244 through the operation rod 246 and connection hook 247.

The connection hook 247 comprises two hook plate members 259 provided with a common notched hook portion 260 and rotatably attached to the other end of the operation rod 246 through a pin 262 so that the notched hook portion 260 is engaged by or disengaged from the pin 261 on the abutment plate interlocking rod 244. The connection hook 247 also comprises an operation handle 263 adapted to engage and disengage from the pin 261 on the abutment plate interlocking rod 244.

The guide 249 consists of a guide plate 264 screwed to a flange positioned in a lower portion of the side frame member 33 and a plurality of spaced abutment plates 265 and comprises a stopper 266 for regulating the movement of the abutment plate interlocking rod 244 in the extending direction of the slidable frame 12.

With the above-mentioned construction and arrangement of the components of the escape means support means locking mechanism 240, when the slidable frame 12 is retracted in the stowage box 11 and held therein, the connection hook 247 is engaged by the pin 261 on the abutment plate interlocking rod 244 and the operation lever 245 is held in the vertical position as shown in FIG. 30 by the return spring 258 and since the abutment plate interlocking rod is urged towards the stopper 266 by the return spring 253, the abutment plates 242, 243 abut against the pusher arms 252 so that the leading ends of the support bars 72 are supported by the swing hanger 241. Thus, the escape means support means 14 is locked on the other side frame member 33.

When the slidable frame 12 is extended out of the stowage box 11 by the shift mechanism 15, before the projection on the slidable frame 12 abuts against the stopper 43 on the stowage box 11, the operation lever 245 abuts against the stopper 248 and is rotated about the pin 257 in the clockwise direction as seen in FIG. 30 against the force of the return spring 258 whereby the abutment plate 242 is also moved leftwards as seen in FIG. 30 as the abutment plate interlocking rod 244 is operated through the operation rod 246 and connection hook 247.

Thus, since the pair of pusher arms 252 disengage from the abutment plates 242, 243, the swing hanger 241 is allowed to swing downwardly to the vertical position as shown by the two dot-chain position in FIG. 32 by its gravity to disengage the leading ends of the support bars 72 from the swing hanger 241.

As the result, the support bars 72 are unlocked and swing downwardly from the horizontal position and the escape means 13 is allowed to telescopically extend from the retracted or horizontal position.

Figure 33:
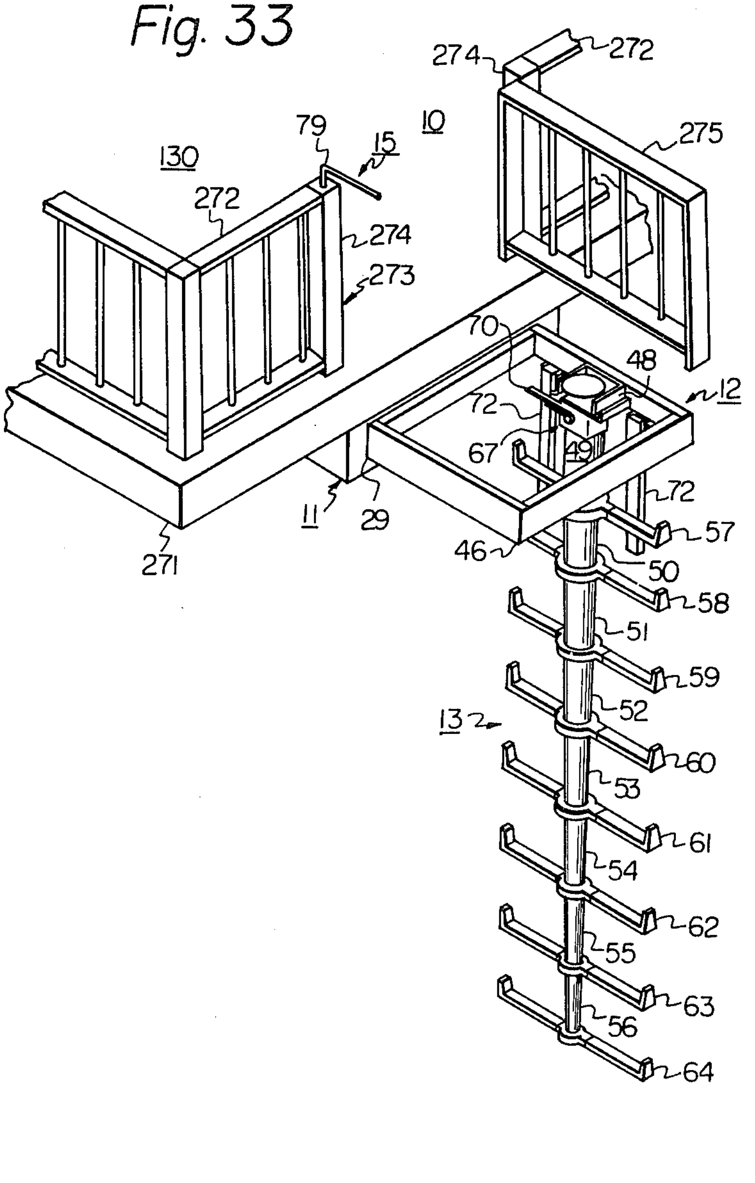
FIG. 33 is a perspective view of the drawer type emergency escape of FIG. 1 in its operative position when the escape is mounted on the veranda of the second floor of a multi-story building.

FIG. 33 schematically shows the drawer type emergency escape of the invention as being applied to a multi-story building 270.

The emergency escape 10 is attached to the veranda 271 of the second floor of the building 270 so that occupants in the second floor can evacuate to the ground. The emergency escape 10 is, of course, mounted on the veranda 271 by attaching the stowage box 11 to the underside of the veranda 271 in the same manner as that for mounting the emergency escape on the cab floor 181 of the dump truck.

In the mounting of the emergency escape 10 on the second floor veranda 271 of the building, the shift handle 79 is extended into and secured to one of pillars 274 which define the emergency exit 273 in the railing 272.

When the occupants on the second floor try to escape from the second floor to the ground by way of the emergency escape 10 upon the occurrence of a fire, for example, first of all, any of the occupants opens the railing door 275 which normally closes the emergency exit 273 in the railing 272 and then manually pushes and rotates the shift handle 79 outwardly.

As the shift handle 79 is rotated in this way, the slidable frame 12 is extended out of the stowage box 11 and the escape means 13 is allowed to telescopically extend downwardly from the slidable frame 12 to the ground in the same manner as described in connection with the emergency escape 10 when mounted on the dump truck 180.

Thus, the occupants can evacuate from the second floor veranda 271 to the ground by descending the successive rungs 57, 58 . . . 64 of the escape means 13 while gripping the grip bar (not shown) and then to a safer place.

In an inspection to be performed after the use of the emergency escape 10, if it has been found that the escape 10 has no defect and still functions normally, the escape means 13 is pulled up in the same manner as described in connection with when the escape is mounted on the dump truck 180 and then received in the slidable frame 12 by the use of the escape means support means 14 and rotated by turning the shift handle 79 inwardly.

When the shift handle 79 is rotated in this way, the slidable frame 12 is retracted into the stowage box 11 to return the emergency escape 10 to the initial position.

Figure 34:
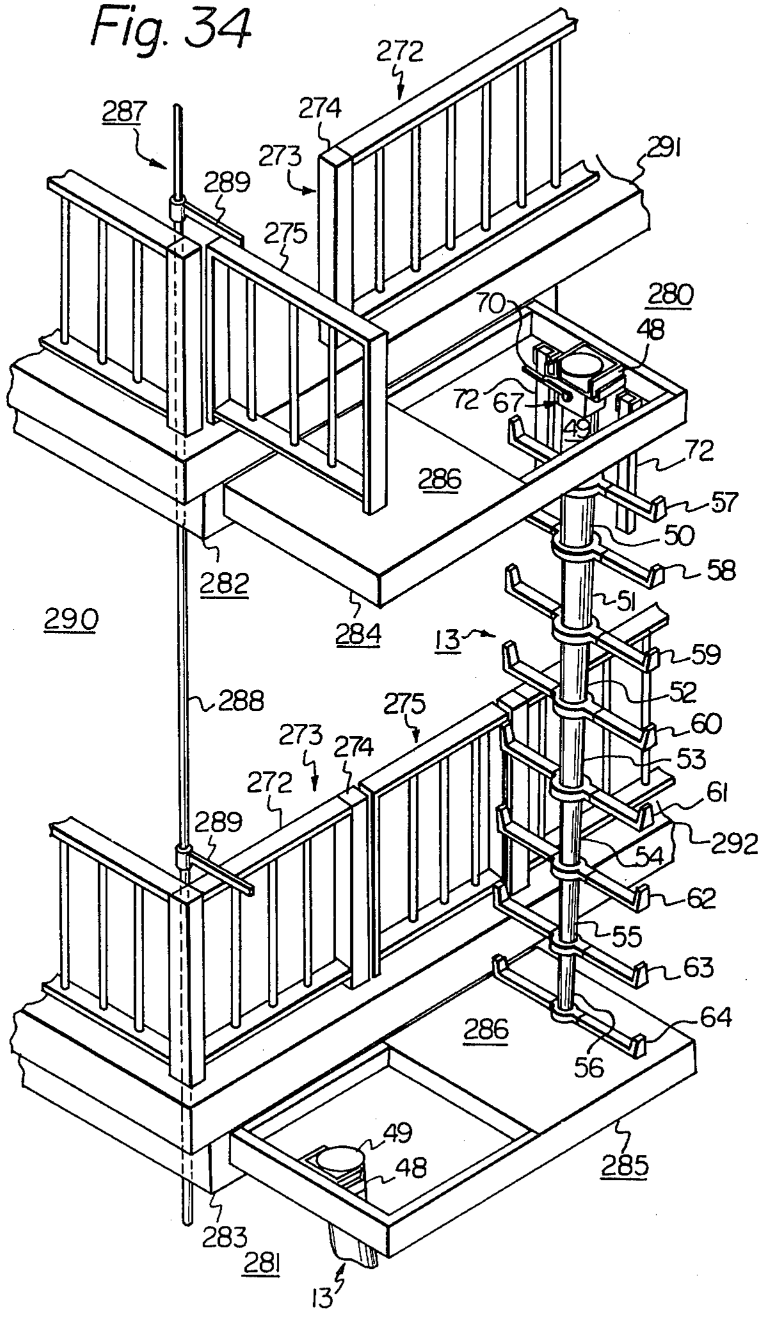
FIG. 34 is a perspective view of modified drawer type emergency escapes of the present invention in their operative position when the escapes are mounted on the verandas of two selected floors of a multi-story building such as a mansion or apartment house.

FIG. 34 schematically shows modified emergency escapes 280, 281 of the present invention mounted on two selected floors of a multi-story building such as a mansion 290.

The modified emergency escapes are mounted on the verandas 291, 292 of the multi-story building in such a manner that the escape 280 is mounted on the upper floor and the emergency escape 281 is mounted on the veranda 292 of the lower floor to provide an escape path from the upper floor to the lower floor or the ground.

The emergency escapes 280, 281 are substantially similar to the embodiment as described hereinabove in connection with FIGS. 1 to 23 inclusive except that the slidable frame 12 and the shift handle 79 of the shift mechanism are modified.

That is, the slidable frames 284, 285 of the escapes 280, 281, respectively, are added landings 286 thereto.

The escape means 13 adapted to be extended out of and retracted into the slidable frame 284 and the landing 286 in the emergency escape 280 associated with the upper floor and the corresponding parts of the emergency escape associated with the lower floor are staggered to each other, respectively, so that the escape means 13 of the escape 280 can extend down to the landing 286 of the escape 281.

In order to cope with the construction of the slidable frames 284, 285 of the modified emergency escapes 280, 281, respectively, the stowage boxes 282, 283 of the emergency escapes 280, 281, respectively, are formed larger than the stowage box 11 of the emergency escape 10.

The shift mechanism 287 of the emergency escapes 280, 281 associated with the selected floor verandas 291, 292 are constituted by a single or common interlocking shift rod 288 which extends through the two floor verandas 291, 292 and drive arm cases 78 of the two emergency escapes and the common interlocking shift rod 288 has a plurality of operation handles 289 mounted thereon with each one associated with each floor.

With the drawer type emergency escapes 280, 281 of the above-mentioned construction mounted on the verandas 291, 292 of the two selected floors, when a fire occurs on the floor associated with the veranda 291, for example, the occupants on the floor can evacuate from the floor to the next lower floor or floors or the ground by way of the emergency escape or escapes. That is, any one of the occupants on the floor where the fire occurred pushes the operation handle 289 of the escape for such a floor outwardly to rotate the interlocking shift rod 288.

As the interlocking shift rod 288 is rotated, the emergency escapes 280, 281 on the two floors are extended out of the stowage boxes 282, 283 whereby the escape means 13 attached to the upper floor slidable frame 284 of the escape 280 is allowed to telescopically extend downwardly to the landing 286 formed on the lower floor slidable frame 285.

Thus, the occupants on the upper floor grip the grip bar (not shown) and move from the veranda 291 onto the landing 286 formed on the slidable frame 286 by opening the railing door 275 which normally closes the emergency exit 273 in the railing 272, transfer from the landing 286 onto the escape means 13 of the lower floor slidable frame 285 and descend down the successive rungs. By repeating the procedure, the occupants can ride on the extended emergency escapes associated with the successive lower floors one after another.

In inspections to be conducted after the extinction of the fire, if it has been found that each of the emergency escapes 280, 281 has no defect and functions properly, by following the same procedure as described in connection with the embodiment as shown in FIGS. 1 to 23 inclusive, the escape means 13 on each floor is pulled up and retracted into the slidable frame 284 (or 285) by the use of the respectively associated escape means support means 14 and the operation handle 289 for a particular floor is pulled inwardly to rotate the interlocking shift rod 288 to simultaneously retract the slidable frames 284, 285 of the two floors into the respectively associated stowage boxes 280, 281, respectively, to return the escapes 280, 281 to their initial position.

While several preferred embodiments of the invention have been shown and described in detail, it will be understood that the same are for illustration purpose only and not to be taken as a definition of the invention, reference being had for this purpose to the appended claims.

What is claimed is:

1. A drawer type emergency escape comprising:
- a stowage box adapted to be attached to a support;
- a slidable frame adapted to be slidably extended out of and retracted into said stowage box;
- a telescopically extensible escape means attached to said slidable frame to be received into and extended out of the frame; and
- a shift mechanism including a drive arm connected to a shift handle, a slide shift link, a connection link connecting said drive arm to said slide shift link and an extensible tong means disposed between said slide shift link and slidable frame for extending and retracting said slidable frame out of and into said stowage box.

2. A drawer type emergency escape as claimed in claim 1, in which said shift mechanism further includes a link guide means disposed adjacent to the opening in said stowage box for guiding said slide shift link in a direction intersecting the extending direction of said slidable frame at right angles.

3. A drawer type emergency escape as claimed in claim 2, in which said shift mechanism includes two sets of extensible tongs pivotally connected to each other by pin means, one of said two sets of extensible tongs comprising a first tong member pivoted to said slide shift link and a second tong member pivoted to said stowage box and the other of said two sets of extensible tongs comprising a first tong member pivoted to said slidable frame and a second tong member adapted to be guided by means of a roller along a tong guide groove in a direction intersecting said extending direction of the slidable frame.

4. A drawer type emergency escape as claimed in claim 3, in which said first tong member of the one set of tongs is pivoted to a slot formed in the leading end of said slide shift link by means of a pin.

5. A drawer type emergency escape as claimed in claim 1, further including a shift locking mechanism for selectively restraining said shift mechanism in the non-shifted position corresponding to the storaged position of said slidable frame and in the shifted position corresponding to the extended position of the slidable frame.

6. A drawer type emergency escape as claimed in claim 5, in which said shift locking mechanism includes a rotary lock plate in abutment against an engaging pin on said drive arm of the shift mechanism, a stopper rod pivoted at one end to said lock plate and slidably supported at the other end by a holder for reciprocal movement and a compressive spring disposed between the flange of said stopper rod and said holder in coaxial with the stopper rod.

7. A drawer type emergency escape as claimed in claim 6, in which said lock plate has a locking ramp and a shift ramp on the opposite sides of a center transition point and is connected to said stopper rod by means of a pin.

8. A drawer type emergency escape as claimed in claim 4, further including a locking mechanism associated with said stowage box for locking said slidable frame on the stowage box in the storaged position.

9. A drawer type emergency escape as claimed in claim 8, in which said locking mechanism associated with the stowage box includes a rocking bar rotatably held on the bracket of said stowage box by means of a pin, a rocking bar receiving opening formed in one side frame member of said slidable frame, an interlocking rod for rotating said rocking bar about said pin, a drive plate operable by said slide shift link, a movement transmission plate for operating said interlocking plate, a connection rod connecting between said transmission plate and drive plate and a return spring urging said interlocking rod to its initiation position.

10. A drawer type emergency escape as claimed in claim 1, further including a detent mechanism for locking said slidable frame on said stowage box in the extended position.

11. A drawer type emergency escape as claimed in claim 10, in which said detent mechanism includes a stepped guide plate mounted on said stowage box, a rotary pawl provided on said one side frame member of the slidable frame and a balance bar normally urging said rotary pawl to contact said stepped guide plate.

12. A drawer type emergency escape as claimed in claim 1, further including an escape means support means adapted to hold said escape means within said slidable frame in the horizontal position when the slidable frame is storaged in said stowage box and to allow the escape means to extend downwardly when the slidable frame is extended out of the stowage box.

13. A drawer type emergency escape as claimed in claim 12, said escape means support means comprises a pair of support bars one of which is pivoted to said one side frame member of the slidable frame member by means of a pin.

14. A drawer type emergency escape as claimed in claim 13, further including an escape means support means locking mechanism adapted to lock said escape means support means on said slidable frame in the horizontal position when the slidable frame is retracted in said stowage box.

15. A drawer type emergency escape as claimed in claim 14, in which said escape means support means locking mechanism includes a pair of slidable hooks provided on the other side frame member of said slidable frame for engaging the leading ends of said support bars, an interlocking rod interlocking said slide hooks with each other, an operation lever mounted on said other side frame member of the slidable frame, an operation rod connecting said operation lever to said interlocking rod through a connection mechanism and a stopper provided on said stowage box in a position so as to abut against said operation lever when said slidable frame is extended out of said stowage box.

16. A drawer type emergency escape as claimed in claim 14, said escape means support means locking mechanism includes a pair of pusher plates provided on said other side frame member of the slidable frame for engaging the leading ends of said support bars, a pair of cam plates operating said pusher plates for reciprocal movement, an interlocking rod interlocking said cam plates with each other, an operation lever provided on said other side frame member and a stopper provided in a position so as to abut against said operation lever when said slidable frame is extended out of said stowage box.

17. A drawer type emergency escape as claimed in claim 14, in which said escape means support means locking mechanism includes swing hangers rotatably attached to said other side frame member of the slidable frame for engaging the leading ends of said support bars, a plate interlocking rod provided on said other side frame member of the slidable frame and comprising a pair of abutment plates for receiving the pusher arms of said swing hangers, an operation lever provided on said other side frame member of the slidable frame, an operation rod connected at one end to said operation lever by means of a pin and at the other end to said operation rod through a connection hook, a stopper provided on said other side frame member of the slidable frame in a position so as to abut against said operation lever and a guide provided on the other side frame member of the slidable frame for guiding said abutment plate interlocking rod for slidably reciprocal movement in the longitudinal direction of the other side frame member.

18. A drawer type emergency escape system for installation in a multi-story building, comprising a plurality of escape devices, each having:

- a stowage box adapted to be attached to a support;
- a slidable frame adapted to be slidably extended out of and retracted into said stowage box;
- a telescopically extensible escape means attached to said slidable frame to be received into and extended out of the frame; and
- a shift mechanism including a drive arm connected to a shift handle, a slide shift link, a connection link connecting said drive arm to said slide shift link and an extensible tong means disposed between said slide shift link and slidable frame for extending and retracting said slidable frame out of and into said stowage box.

19. A drawer type emergency escape system as claimed in claim 18, in which the shift handle of the shift mechanism for each floor of a multi-story building comprises an interlocking shift rod connected to the shift rod of the shift mechanism for an adjacent floor and an operation handle secured to said interlocking shift rod of the associated shift mechanism for each floor.

* * * * *